(12) United States Patent
Mitchell

(10) Patent No.: US 7,778,026 B2
(45) Date of Patent: Aug. 17, 2010

(54) LAPTOP COMPUTER CARRYING CASE THAT TRANSFORMS INTO A DESK TOP

(76) Inventor: Kevin Mitchell, 3807 Norwood Ave., Downingtown, PA (US) 19335

( * ) Notice: Subject to any disclaimer, the term of this patent is extended or adjusted under 35 U.S.C. 154(b) by 86 days.

(21) Appl. No.: 12/313,065

(22) Filed: Nov. 17, 2008

(65) Prior Publication Data
US 2010/0124013 A1 May 20, 2010

(51) Int. Cl.
*G06F 1/16* (2006.01)
(52) U.S. Cl. .............. 361/679.55; 224/648; 206/522; 455/446; 248/454
(58) Field of Classification Search ............ 224/648, 224/154, 600, 576; 206/522, 320, 45.23, 206/576, 521; 455/573, 446, 411, 41.2, 73; 361/679.55, 679.4, 679.1, 679.46, 679.58, 361/679.41, 679.25, 679.27; 248/226.11, 248/454
See application file for complete search history.

(56) References Cited

U.S. PATENT DOCUMENTS

| | | | | |
|---|---|---|---|---|
| 5,639,004 | A | 6/1997 | Carlton et al. | 224/579 |
| 5,667,114 | A | 9/1997 | Bourque | 227/270 |
| 5,762,250 | A | 6/1998 | Carlton et al. | 224/579 |
| 5,887,777 | A | 3/1999 | Myles et al. | 224/578 |
| 5,971,148 | A | 10/1999 | Jackson | 206/320 |
| 6,354,477 | B1 | 3/2002 | Trummer | 224/575 |
| 6,381,127 | B1 | 4/2002 | Maddali et al. | 361/683 |
| 7,327,562 | B2 | 2/2008 | Littlepage | 361/683 |
| 2005/0284791 | A1* | 12/2005 | Sadow | 206/522 |
| 2007/0051766 | A1 | 3/2007 | Spencer | 224/607 |
| 2009/0159630 | A1* | 6/2009 | Ko | 224/648 |
| 2009/0272779 | A1* | 11/2009 | Vu | 224/677 |
| 2010/0038393 | A1* | 2/2010 | Zhang | 224/600 |

FOREIGN PATENT DOCUMENTS

KR   10-2004-0093345 A    5/2004

OTHER PUBLICATIONS

Infocase, Field Mate User Harness Strip Jul. 2, 2008.

* cited by examiner

*Primary Examiner*—Hung V Duong
(74) *Attorney, Agent, or Firm*—Michael F. Petock, Esq.; Petock & Petock, LLC

(57) ABSTRACT

A laptop computer carrying case transforms into a desktop for use of a laptop or similar electronic device having a keyboard and a hingeably openable display. The laptop key board is held by bands in the lower portion of the case and the display is held in the top section of the case. Hinge structures are provided on the left and right sidewalls of the bottom section of the case. When the hinge structures are pivotally angularly separated, the bottom section containing the keyboard will be substantially horizontal enabling use of the laptop in a standing or mobile position. When the laptop is not being used, the case may be closed and the hinge structures closed with the laptop being carried by the strap over the shoulder. The hinge structure is provided with structure for limiting the amount by which the arms of the hinge may be pivotally angularly separated thereby providing stability to the laptop case in the desk top position. Detent means is provided to hold the arms of the hinge structure in aligned position when the case is being used to carry the laptop.

9 Claims, 6 Drawing Sheets

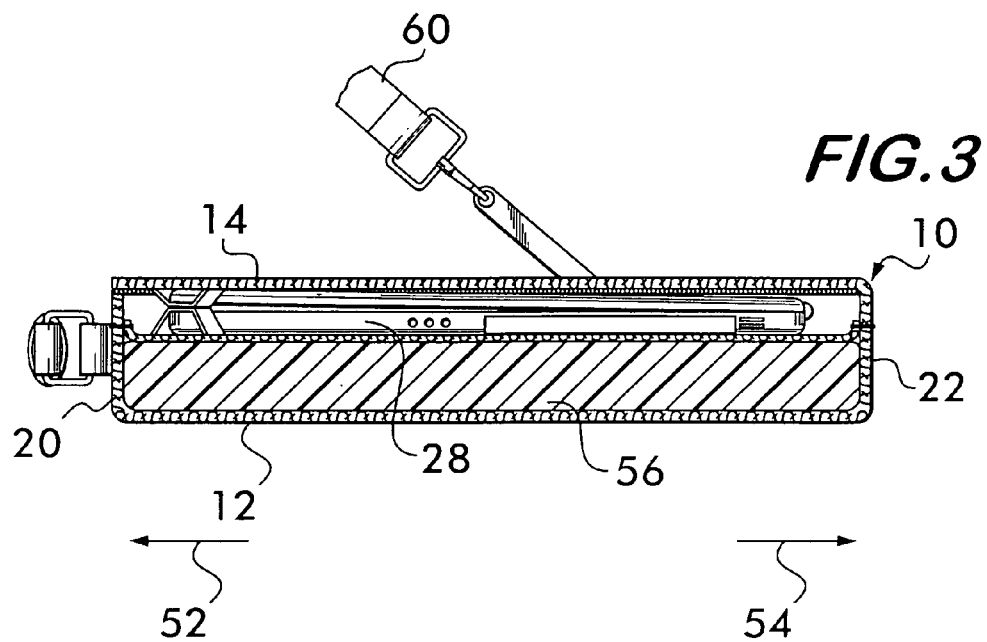
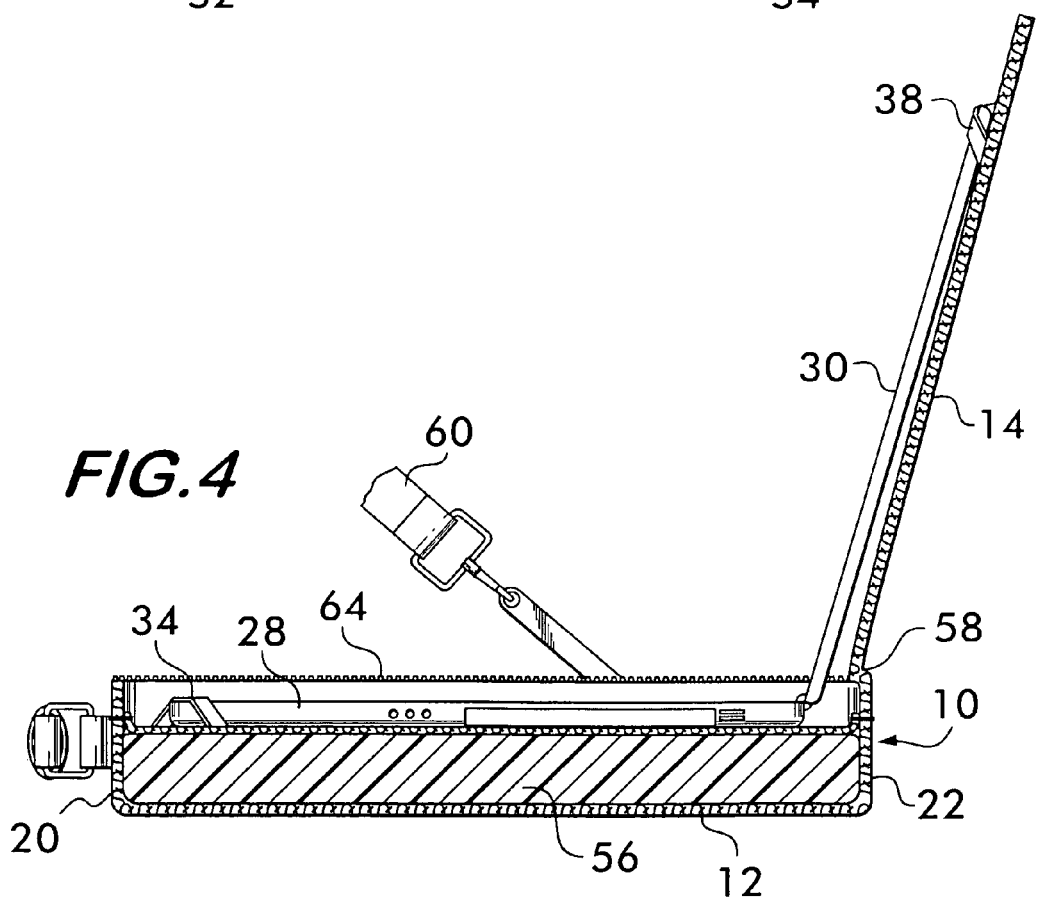

LAPTOP COMPUTER CARRYING CASE THAT TRANSFORMS INTO A DESK TOP

FIELD OF THE INVENTION

The present invention relates to a laptop computer carrying case. More particularly, the present invention relates to a laptop computer carrying case that may be utilized to carry a laptop computer and may be used to support the laptop for use as a desk top.

BACKGROUND OF THE INVENTION

Laptop computers and other electronic devices having a keyboard and a display screen have come into widespread use. These are used widely for business and personal use to store information and access information via the internet and in other ways. Laptop computers and similar devices are often carried by people to and from work, on business trips and on personal trips. Further, they may be utilized in businesses where it is necessary to access data or input data in a mobile manner, such as while walking around or standing, including performing functions such as taking inventory or entering surveying data while standing or moving about.

This has presented significant difficulty for many users wherein often times they are balancing a computer on one hand while trying to operate it with the other hand.

SUMMARY OF THE INVENTION

The present invention provides significant advantages in that it provides a means wherein a laptop computer carrying case may transform a laptop into a desk top which may be utilized conveniently in a standing or other mobile position.

As used herein throughout the specification, abstract and claims, the term laptop computer includes any portable electronic device provided with a keyboard or data inputting means and a display screen which may be opened for use at various locations. This may include, but is not limited to any type of electronic device with input and display means which is portable, such as but not limited to, dedicated type computers for storing data in various fields such as surveying, inventory or moving and storage, gaming or any other application.

As used herein throughout the specification, abstract and claims, the term "substantially horizontal" includes any position of the laptop in which the laptop may be used, that is input may be put into the computer by use of a keyboard as/or pointer apparatus such as a touch pad and a display screen may be visualized by the user. In other words, substantially horizontal would include any position which deviates by at least 30 degrees up and 30 degrees down from the horizontal position.

Another advantage of the present invention is that is provides a laptop computer carrying case that transforms into a desk top wherein bulky structure is not required.

Another advantage of the present invention is that the strap structure may be relatively light weight and simple, comparable to typical laptop computer carrying case straps, not bulky harness such as might be needed to wrap around a back, shoulders and the like.

Another advantage of the present invention is that the structure on the side of the laptop carrying case is compact, substantially folds into itself and may be extended to rigidly support the laptop carrying case in a substantially horizontal position for use of the laptop.

Another advantage of the present invention is that it provides an ergonomic pad for use around the neck which applies more of the load to the trapezius muscles as contrasted to the back of the neck.

Briefly and basically, in accordance with the present invention apparatus is provided in the form of a laptop computer case having a bottom section with a left sidewall, right sidewall, front sidewall and back sidewall extending up from the bottom section. The laptop computer case includes a top section flexibly attached to the back sidewall of the bottom section and releasably securable to the left, right and front sidewalls of the bottom section. A laptop computer is mounted in the laptop computer case by means of elastic bands secured to an interior surface of the bottom section for securing the keyboard portion of the laptop computer and elastic bands secured to an interior portion of the top section for securing a screen display portion of the laptop computer. A hinge structure is attached to the left sidewall and to the right side-wall of the bottom section. Preferably the hinge structure is attached to an exterior surface of the sidewall. Each of the hinge structures is comprised of a first arm and a second arm pivotally connected together near a first end of the first and second arms. The first arms are attached to the left and right sides of the laptop computer case. The pivotal connection between the first arm and the second arm is located near the back of the laptop computer case. The second arm of each hinge structure is connected to a laptop computer case strap. Means are provided in each hinge structure for limiting the degree to which the second arm may pivot with respect to the first arm. Means are provided for releasably securing the second arm in alignment with the first arm. In this manner, the laptop carrying case containing the laptop may be held by the strap around the neck in a substantially horizontal position wherein the laptop computer carrying case may be utilized as a desk top when the second arm of each hinge structure is pivotally separated from the first arm and wherein the laptop computer case may be used as a carrying case when the first and second arm are held in alignment.

The laptop computer case may be provided with an ergonomic pad which applies less pressure to the back of the neck and more pressure to the trapezius muscles. This ergonomic pad may be in the form of an elongated pad which is slidably mounted on the strap and has a concave portion along at least one of its elongated sides or surfaces so that more of the load of the laptop computer case is applied to the trapezius muscles of a wearer as compared to the back of the neck when the strap is around the neck.

The means on each of the hinge structures for limiting the degree to which the second arm may pivot with respect to the first arm may be a stop or structure within the pivot point or close to the pivot point which prevents the second arm from separating by more than a predetermined number of degrees, such as 45 degrees from the first member or it may be a member attached to the first arm with a catch for engaging the second arm so that the rotational movement about the pivot of the second arm with respect to the first arm is limited. Alternatively, the means on each hinge structure for limiting the degree to which the second arm may pivot with respect to the first arm may be a catch formed on or as part of the second arm rearward or behind the pivotal connection between the two arms. In other words, the means on each hinge structure for limiting the degree to which the second arm may pivot with respect to the first arm may be a member with a catch attached to one of the arms for engaging the other arm so that rotational movement about the pivot of the second arm with respect to the first arm is limited.

In a presently preferred embodiment, the elastic bands for holding the laptop in the computer case may be two elastic bands mounted in the bottom section for engaging the front corners of the laptop computer keyboard and a third and fourth elastic bands mounted to an interior portion of the top section of the case for engaging the forward corners of the screen display portion of the laptop computer.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1A is a laptop computer carrying case in accordance with the present invention wherein the laptop computer case is closed and is being utilized to carry the laptop computer.

FIG. 3 is a cross sectional view taken along line 3-3 of a laptop computer case in accordance with present invention wherein the laptop computer case is in the closed position.

FIG. 4 is a cross sectional view taken along line 3-3 of FIG. 2.

FIG. 8 is a partially broken away side elevation view of the embodiment of FIG. 8 wherein the laptop computer case is used for carrying.

DETAILED DESCRIPTION OF THE PREFERRED EMBODIMENTS

Figure 1:
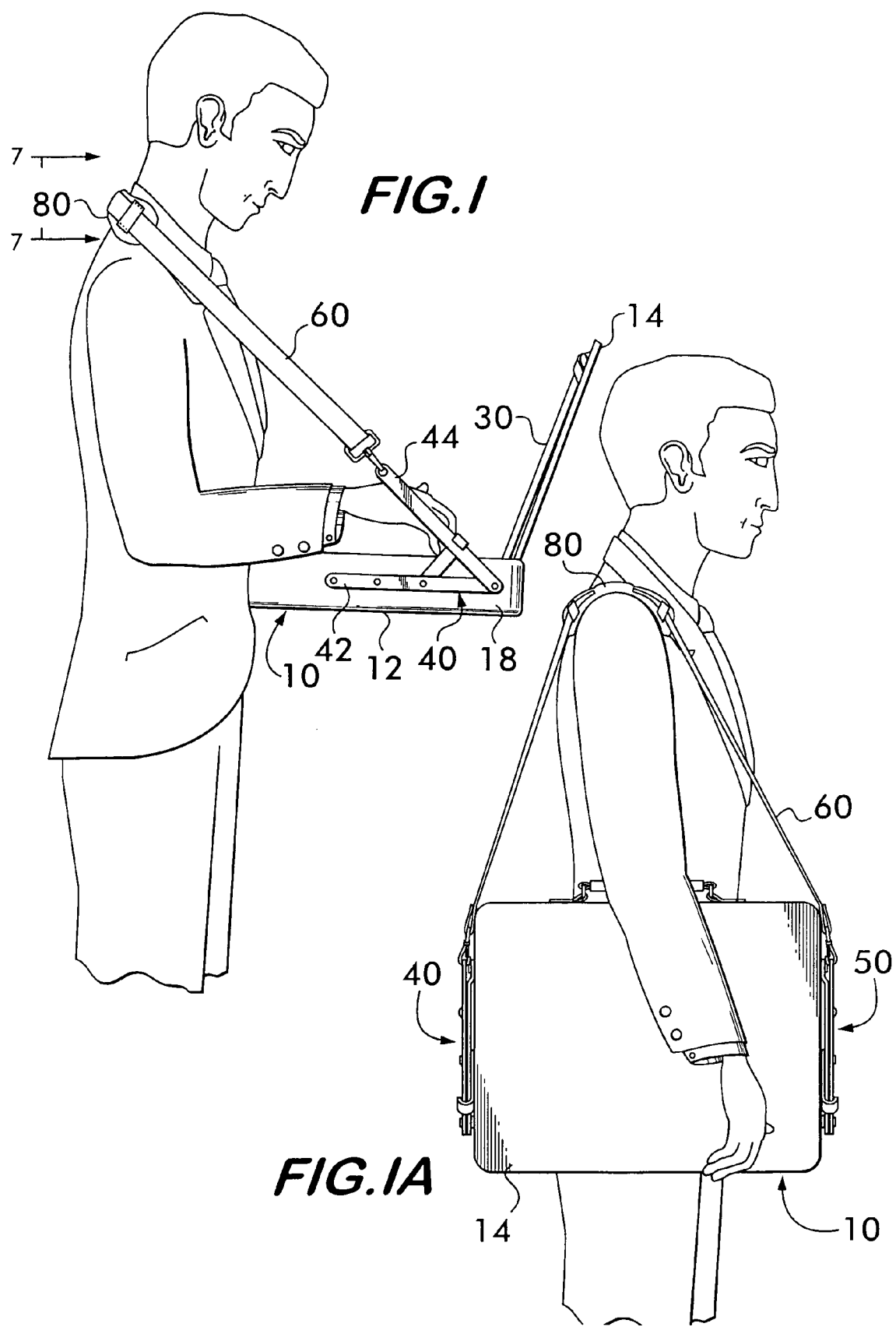
FIG. 1 is a side elevation view, partially broken away of a laptop computer carrying case in accordance with the present invention transformed into a desk top computer for use by the wearer.
Figure 2:
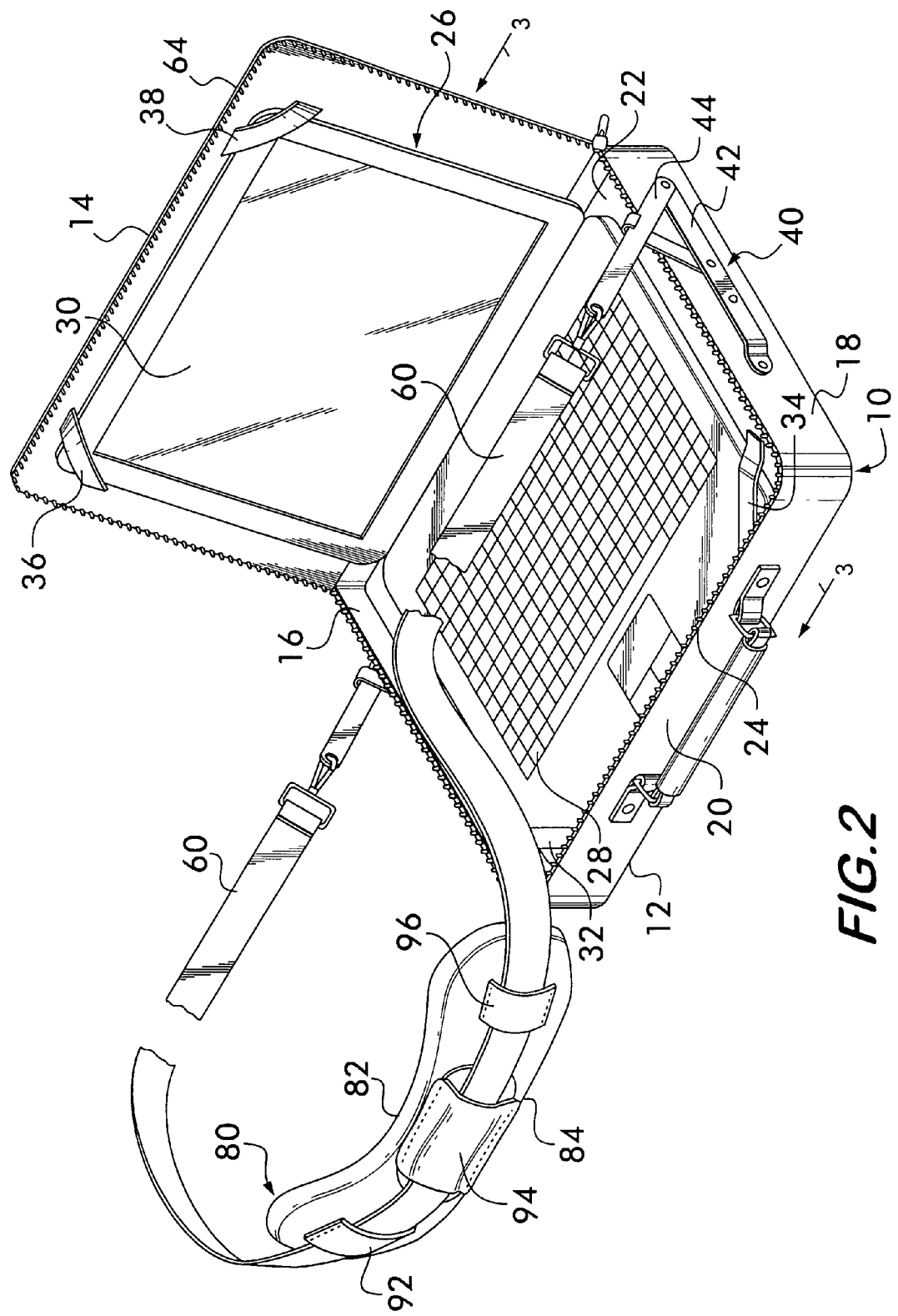
FIG. 2 is a view in perspective of a laptop computer case in accordance with the present invention illustrating a laptop computer secured therein and the strap with the ergonomic pad, the laptop computer case being open and hinge structure on the side with the arms of the hinge structure being pivotally separated.

Referring now to the drawings, wherein like numerals indicate like elements, there is shown in FIGS. 1, 1A, 2, 3 and 4 a laptop computer case 10 in accordance with the present invention. Laptop computer case 10 has a bottom section 12 and a top section 14. The bottom section 12 has a left sidewall 16, a right sidewall 18, a front sidewall 20 and a back sidewall 22, as may be best seen in FIG. 2. The top section 14 may be flexibly attached to back sidewall 22 at 58 and releasably securable to left sidewall 16, right sidewall 18 and front sidewall 20 by means of a zipper 64, velcro or any other suitable releasable securing means. Releasable securing means is illustrated in FIG. 2 as a zipper 24, but it is understood that other types of releasable and securable means for opening and closing the top 14 with respect to bottom section 12 may be utilized. Further, the flexible attachment between the top section 14 and the bottom section 12 may be any suitable hinge like structure including flexible fabric material, a hinge or any other flexible structure which allows top section 14 to open and close with respect to bottom section 12.

As may be best seen in FIG. 2, a laptop computer 26 or other suitable electronic device having a keyboard and display means may be mounted in laptop carrying case 10. Laptop computer 26 has a keyboard portion 28 and a display portion 30 which is hingeably connected together at 58 as may be best seen in FIG. 4, and as is conventional. The laptop computer 26 is mounted in carrying case 10 by elastic bands secured to an interior surface of bottom section 12 securing the keyboard portion 28 of laptop computer 26 and by elastic band secured to an interior surface of top section 14 for securing screen display portion 30 of a laptop computer to carrying case 10. More particularly, a first elastic band 32 and a second elastic band 34 are mounted to the interior surface of bottom section 12 for engaging the front corners of the laptop computer keyboard portion. A third elastic band 36 and a fourth elastic band 38 are mounted to an interior surface of the top section 14 engaging the forward corners of the screen display portion 30 of laptop computer 26. For reference, as shown in FIG. 3 and other figures, arrow 52 is in the direction of the front of laptop computer carrying case 10 and arrow 54 points in the direction of the back or rearward portion of laptop computer carrying case 10. Although it is preferable that bands 32, 34, 36 and 38 are elastic bands, it is understood that any suitable banding may be utilized, and not necessarily elastic. Further, various types of elastic materials may be utilized. For example, bands 32, 34, 36 and 38 may be bands which are openable and closeable by means of hook and loop fasteners such as VELCRO fasteners.

FIGS. 3 and 4 are cross sectional views taken along line 3-3 of FIG. 2, with exception that FIG. 3 shows case 10 in the closed position. FIGS. 3 and 4 also show an optional support pad 56 for laptop computer 26 which may be utilized to provide additional support for the laptop computer and may be utilized to adjust the height of the laptop key board within laptop carrying case 10. Support pad 56 may be made of any suitable material such as rubber or foam plastic where flexibility is desired and more rigid materials such as rigid plastic to provide more rigidity. However, any other suitable material may be utilized, including but limited to, wood.

Figure 5:
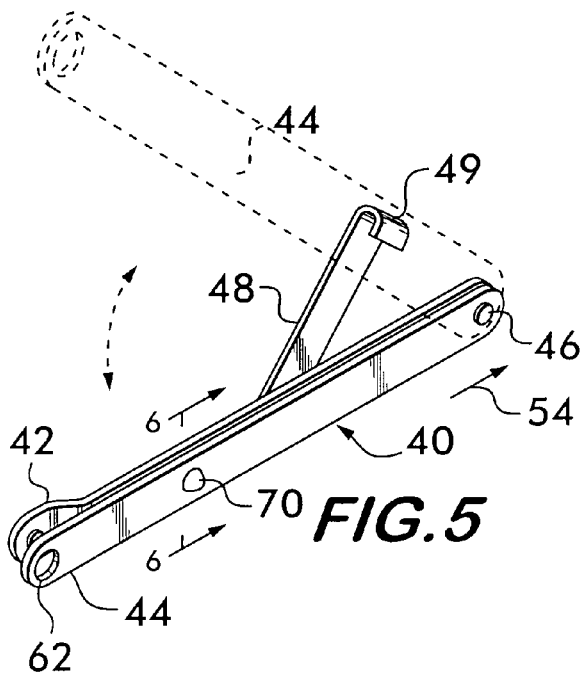
FIG. 5 is a view of perspective of a hinge structure wherein the arms of the hinge are aligned and are in position for carrying, and the second arm shown in dotted outline form wherein the arms would be pivotally angularly separated for use when the carrying case is transformed into a desk top.
Figure 6:
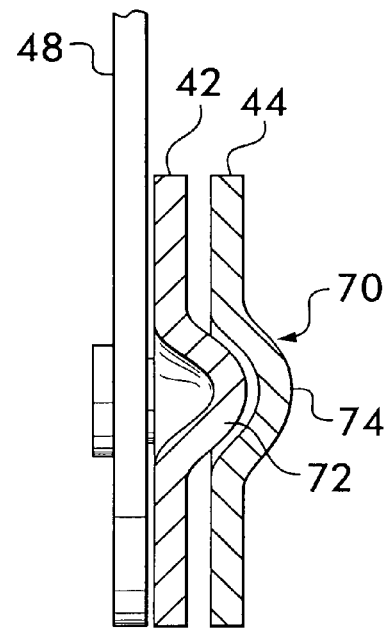
FIG. 6 is a cross sectional view taken along line 6-6 of FIG. 5.

There is shown a hinge structure 40, 50 in FIGS. 1, 1A and 2, and in greater detail in FIGS. 5 and 6. More specifically, there is a hinge structure 40 attached to the right sidewall 18 and a hinge structure 50 connected to the left sidewall 16. Hinge structures 40, 50 may be substantially identical mirror image structures. Each of the hinge structures is comprised of a first and second arm.

Referring now to FIG. 5, there is shown hinge structure 40 attached to the right sidewall 18 which is comprised of a first arm 42 and a second arm 44. First arm 42 and second arm 44 are pivotally connected together near a back end of the first and second arms. Specifically referring to hinge structure 40, first arm 42 is pivotally connected to second arm 44 near its back end at pivot pin or rivet 46 located near a back end of the first and second arms. Pivot structure 46 may include a stop for rotary movement of the second arm 44 with respect to the first arm 42. Alternatively, as shown in FIGS. 1, 2, 5 and 6, first arm 42 may be provided with member 48 with a catch 49 for catching or stopping the rotational pivotal movement of second arm 44 with respect to first arm 40. The position of member 48 with respect to first member 42 may be selected and integrally formed with first member and fixed, or member 48 may be attached to first member 42 and possibly rotatable to some degree with respect to member 42 to limit the degree to which it may extend beyond top section 14 once top section 14 is closed. As discussed above, pivotal connection 46 between the first member and the second member is near the back of the first and second arms i.e. in the direction of arrow 54. Further, first member 42 is mounted to the case as shown in FIGS. 1 and 2 such that the pivotal connection 46 between the first arm 42 and the second arm 44 is near the back of the laptop computer case. The same applies to hinge structure 50 on the opposite side of the case.

Other suitable means may be utilized to limit the degree of rotation of second member 44 with respect to first member 42. Second member 44 is connected to a laptop computer case strap 60. The limitation of rotation of motion of second arm 44 with respect to first arm 42 provides stability to the laptop computer case when the case is opened with the computer and the case positioned in the horizontal position for use with strap 60 mounted over the neck of the wearer.

Figure 8:
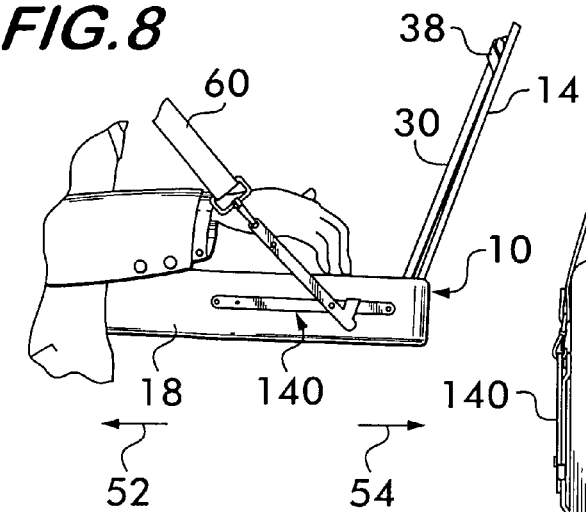
FIG. 8 is a partially broken away side elevation view of another embodiment of the present invention showing a second embodiment of a hinge structure having a catch formed on the second arm of the hinge rearward or in back of the pivotal connection between the arms.
Figure 8A:
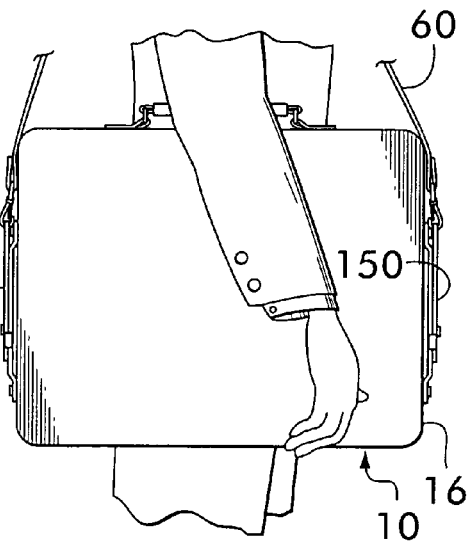
Figure 10:
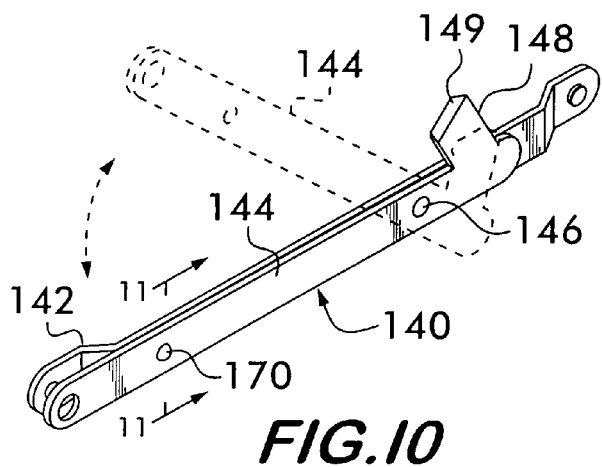
FIG. 10 is a view in perspective of the hinge of the embodiment of FIG. 8 with the arms aligned in the carrying position and the second arm shown in dotted lines in angularly separated position for use of the laptop computer case as a desk top.
Figure 11:
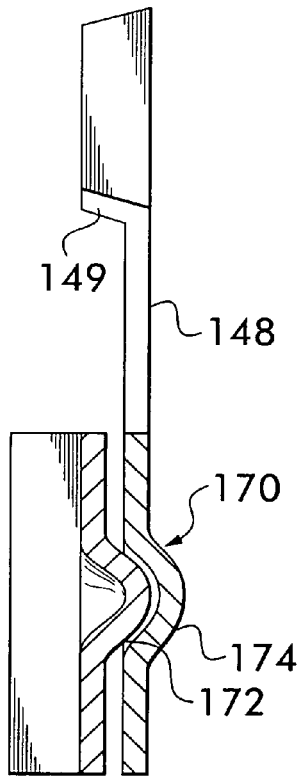
FIG. 11 is a cross sectional view taken along line 11-11 of FIG. 10.

The hinged structure is provided with means 70 for releasably securing the second arm 44 in alignment with the first arm 42. The means 70 for releasably securing the second arm 44 in alignment with first arm 42 may be various structures including, but not limited to projections on the upper and lower edge of first member 42 which second member snaps over, a push button pin with a hole in the other member and various other types of releasable securing means. However in a presently preferred embodiment, a releasable securing means 70 is shown in greater detail as a detent mechanism by the cross sectional view shown in FIG. 6 taken along line 6-6 of FIG. 5. The detent mechanism 70 may be comprised of a projection 72 formed in first member 42 which mates with a similar projection 74 formed in second arm 44. In this manner, when arm 44 is snapped into alignment with first arm 42, projection 70 fits snugly into projection 74 holding the two arms in alignment to enable carrying of the laptop computer carrying case when a laptop computer carrying case strap 60 is attached to second arm 44 at attachment means 62. Attachment means 62 may be any suitable form of attaching strap 60 to second arm 44, but in a presently preferred embodiment would be opening 62. When the strap 60 is attached to attachment means 62 of second arm 44, the laptop computer carrying case 10 may be carried over the shoulder by a wearer or person as illustrated in FIGS. 1A and 8A or laptop computer carrying case 10 may be used as a desk top as illustrated in FIGS. 1 and 2. FIGS. 8, 8A, 9-11 illustrate the same invention with a similar but different hinge structure, which will be discussed hereinafter.

Figure 7:
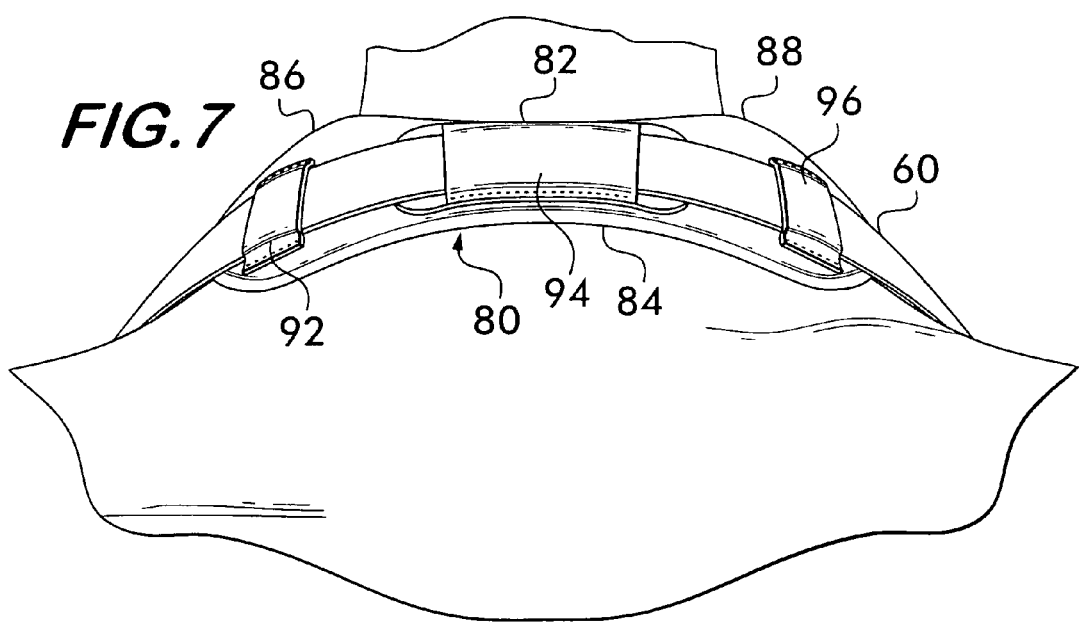
FIG. 7 is a partially broken away elevation view of the ergonomic pad structure taken from the view of line 7-7 of FIG. 1 showing the concave central portion of the pad engaging less of the surface area of the back of the neck.

Referring now to FIG. 7, there is shown a back elevation view in the direction of lines 7-7 of FIG. 1 which illustrates ergonomic pad 80 which is slidably mounted to strap 60. Ergonomic pad 80 is also illustrated in FIGS. 1, 1A and 2. As may be best seen in FIGS. 2 and 7 ergonomic pad 60 is an elongated pad slidably mounted to strap 60 and having a concave shape 82 on at least one of its longer edges to apply more of a load of said laptop computer case strap to the trapezius muscles of a wearer as compared to the back of the neck when the strap is mounted around the neck for use of the laptop computer carrying case as a desk top. More specifically, in a presently preferred embodiment, ergonomic pad 80 is provided with a lower substantially straight elongated edge 84 and an upper downwardly concave longitudinal edge 82. In this manner, the lowest portion of the concave section would be centrally located on the back of the neck placing more of the pressure of the enlarged portions 86 and 88 on the trapezius muscles of the wearer. Ergonomic pad 80 may be slidably mounted on strap 60 by various means, but in the presently preferred embodiment, strap 60 would slide through one or more hoops 92, 94, 96 as illustrated in FIG. 7.

Accordingly, the laptop computer carrying case 10 containing a laptop or other electronic device having a keyboard and a display may be held by the strap around the neck in a substantially horizontal position as illustrated in FIG. 1 wherein the laptop computer carrying case 10 may be utilized as a desktop when the second arm 44 of each hinge structure is pivotally separated as shown for example in FIG. 1. The same laptop computer carrying case 10 may be used as a carrying case when first arm 42 and second arm 44 are held in alignment as illustrated in FIGS. 2, 5 and 6.

Referring now to FIGS. 8, 8A and 9 through 11, the laptop computer case may be identical to that as described with respect to FIGS. 1, 1A and 2 through 7, and the same numerals are applied, except for the hinge structure. There is shown a hinge structure 140 mounted to the exterior surface of a right sidewall 18 of laptop computer carrying case 10. A mirror image similar hinge structure 150 is mounted to the exterior surface of the left sidewall 16 as shown in FIG. 1A.

Each of the hinge structures is comprised of a first arm and a second arm pivotally connected together near a back end of the first and second arms. These are connected to a strap 60 as indicated and as previously described with respect to the other hinge embodiment. The hinge structure will be described with respect to hinge structure 140 shown in FIGS. 8, 9, 10 and 11, which is a right hinge structure. The other hinge structure 150 is a mirror image.

Figure 9:
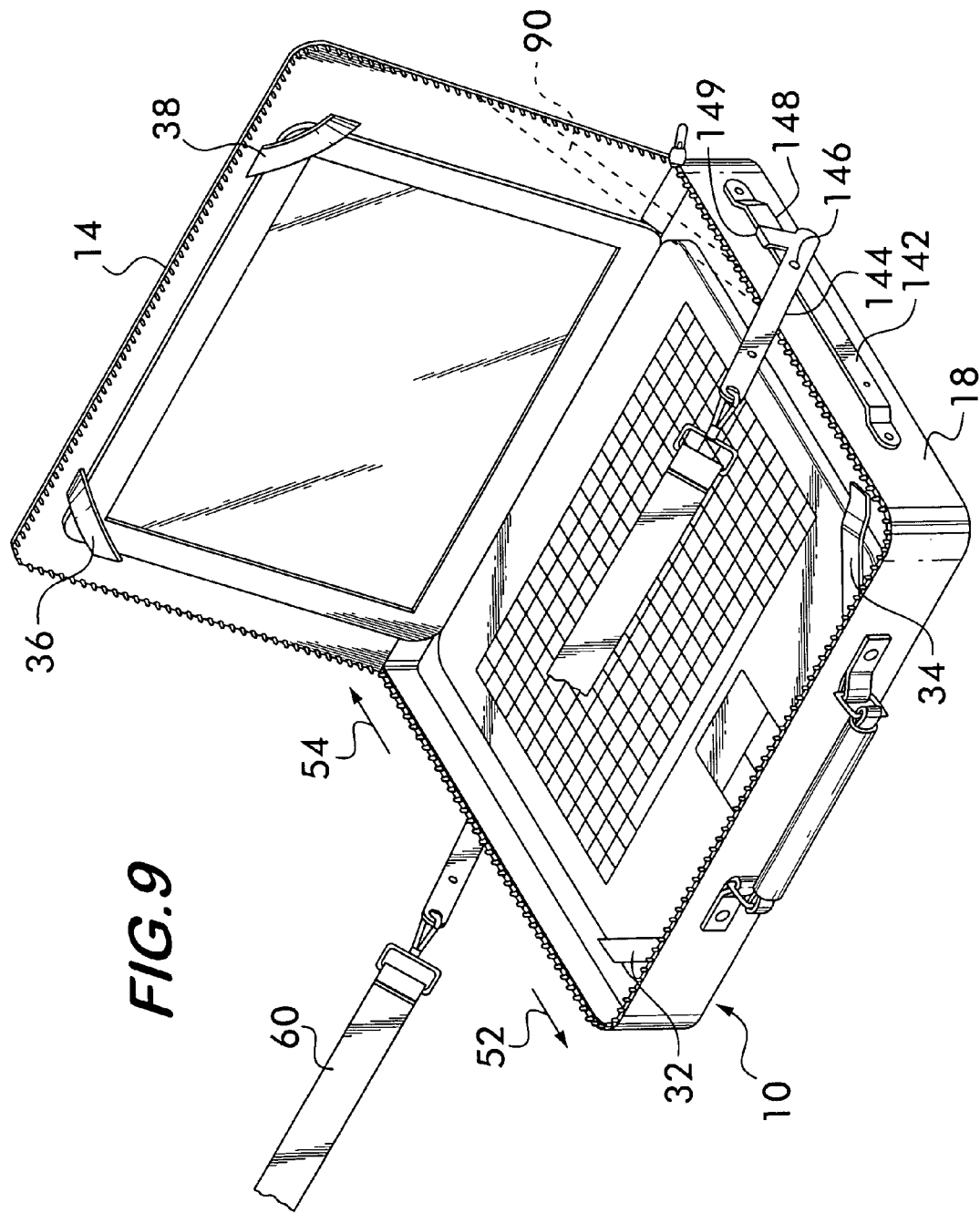
FIG. 9 is a view in perspective of a laptop computer carrying case utilizing the hinge of the second embodiment in the open condition.

Referring to the hinge structure 140, this hinge structure is comprised of a first arm 142 and a second arm 144 pivotally connected together by a pivot pin or rivet or other pivotable connectable structure 146 near a back end of the first and second arms, 142 and 144. Again, back and front is specified by forwardly directing arrow 52 and backwardly directed arrow 54. As best illustrated in FIGS. 8 and 9, first member 142 is attached to the exterior surface of sidewall 18. The pivotal connection 146 between first arm 142 and second arm 144 is near a back of laptop computer case 10. Means is provided on the hinge structure for limiting the degree to which the second arm 144 may pivot with respect to the first arm 142. This may be a projection on the pivot pin which rides in a slot within the pivot structure or may be a catch on a member as illustrated in FIGS. 8, 9, 10 and 11. As illustrated, second member 146 is provided with a member 148 relatively close behind pivot rivet connection 146 with a catch 149 for catching or engaging an edge of hinge arm 142. Member 148 and catch 149 limit the amount of rotational movement of second arm 144 with respect to first arm 142. In a presently preferred embodiment, this would be approximately 45 degrees, however other suitable angles may be selected depending upon size of the laptop computer carrying case, the desired angle and other factors. Another advantage of this embodiment is that catch 149 formed on or attached to second member 144 projects inwardly toward the laptop computer carrying case thereby being less likely to catch on the wearers clothing or other things.

Hinge structure 140 is also provided with a releasable securing means 170 which may be any suitable releasable securing means, but which is preferably a detent formed by projection 172 on first member 142 and a similar corresponding projection 174 on second hinge arm 144.

Member 148 and catch 149 may be integrally formed of the material of second arm 144 or may be a separate member 148 attached to second arm 144. Where it is a separately attached arm, it may be pivotable with respect to second arm 144. In a similar manner, member 48 with catch 49 of the embodiment of FIGS. 1 through 6 may be formed of the material of first hinge arm 42 and therefore immovably or may be a member attached to first hinge arm 42 and be either fixed or movable such that when the hinge is in aligned position, that is where the first and second arm are aligned with each other, the member and catch may be rotated somewhat to reduce the degree to which it projects from arms 42 and 44.

An additional optional feature is that one or more bands may be provided between bottom section 12 and top section 14 to limit the amount of upward and backward travel of top section 14 with respect to bottom section 12. This may be applied to the laptop computer carrying case of either embodiment, but is illustrated merely in dotted lines in FIG. 9 by strap 90 shown in dotted lines. This strap may be applied to each side of the computer carrying case.

The present invention may be embodied in other specific forms without departing from the spirit or essential attributes thereof and, accordingly, reference should be made to the appended claims, rather than to the foregoing specification as indicating the scope of the invention.

I claim:

1. Apparatus, comprising:
a laptop computer case having a bottom section with a left, right, front and back sidewall extending up from said bottom section;
said laptop computer case including a top section flexibly attached to said back side-wall and releasably securable to said left, right and front sidewalls;
a laptop computer mounted in said laptop computer case by means of bands secured to an interior surface of said bottom section for securing a keyboard portion of said laptop computer and bands secured to an interior surface portion of said top section for securing a screen display portion of said laptop computer; and
a hinge structure attached to said left sidewall and to said right sidewall;
each of said hinge structures being comprised of a first arm and a second arm pivotally connected together near a back end of said first and second arms;
said first arms being attached to said left and right sides of said laptop computer case;
said pivotal connection between said first arm and said second arm being near a back of said laptop computer case;
said second arm of each hinge structure being connected to a laptop computer case strap;
and means on each said hinge structure for limiting the degree to which said second arm may pivot with respect to said first arm; and
means for releasably securing said second arm in alignment with said first arm;
whereby said laptop carrying case containing said laptop may be held by said strap around the neck in a substantially horizontal position wherein said laptop computer carrying case may be utilized as a desk top when said second arm of each said hinge structure is pivotally separated and wherein said laptop computer case may be used as a carrying case when said first and second arms are held in alignment.

2. Apparatus in accordance with claim 1, wherein said laptop computer case strap is provided with an ergonomic pad.

3. Apparatus in accordance with claim 2, wherein said ergonomic pad is an elongated pad slidably mounted to said strap and having a concave shape on at least one of its longer edges to apply more of a load of said laptop computer case strap to trapezius muscles of a wearer as compared to the back of the neck when the strap is around the neck.

4. Apparatus in accordance with claim 1, wherein said means on each hinge structure for limiting the degree to which said second arm may pivot with respect to said first arm is a member attached to said first arm with a catch for engaging said second arm.

5. Apparatus in accordance with claim 1, wherein said means on each hinge structure for limiting the degree to which said second arm may pivot with respect to said first arm is a catch on said second arm formed on the back side of said pivotal connection.

6. Apparatus in accordance with claim 5, wherein said catch is integrally formed from said second arm.

7. Apparatus in accordance with claim 1 wherein said means on each hinge structure for limiting the degree to which said second arm may pivot with respect to said first arm comprises a structure in said pivotal connection between said first arm and said second arm for limiting the degree to which said second arm may rotate with respect to said first arm.

8. Apparatus in accordance with claim 1, wherein said bands are comprised of a first and second elastic band mounted to said interior surface of said bottom section engaging the front corners of the laptop computer key board portion and a third and fourth elastic bands mounted to an interior portion of said top section engaging the forward corners of said screen display portion of said laptop computer.

9. Apparatus in accordance with claim 1, including at least one strap connected between said bottom section and said top section for limiting the amount of movement of said top section with respect to said bottom section.

* * * * *